(12) United States Patent
Bonuccelli

(10) Patent No.: US 9,445,668 B2
(45) Date of Patent: Sep. 20, 2016

(54) BOOKCASE STRUCTURE

(71) Applicant: UNIFOR S.p.A., Turate, Como (IT)

(72) Inventor: Dante Bonuccelli, Como (IT)

(73) Assignee: Unifor S.P.A., Turate, Como (IT)

( * ) Notice: Subject to any disclaimer, the term of this patent is extended or adjusted under 35 U.S.C. 154(b) by 0 days.

(21) Appl. No.: 14/814,929

(22) Filed: Jul. 31, 2015

(65) Prior Publication Data
US 2016/0029789 A1    Feb. 4, 2016

(30) Foreign Application Priority Data

Jul. 31, 2014    (IT) .............................. MI2014A1405

(51) Int. Cl.
| | |
|---|---|
| *A47B 63/00* | (2006.01) |
| *A47B 47/00* | (2006.01) |
| *A47B 96/02* | (2006.01) |
| *A47B 47/02* | (2006.01) |
| *A47B 47/04* | (2006.01) |
| *F16B 12/18* | (2006.01) |

(52) U.S. Cl.
CPC ............... *A47B 63/00* (2013.01); *A47B 47/00* (2013.01); *A47B 47/025* (2013.01); *A47B 47/042* (2013.01); *A47B 96/027* (2013.01); *A47B 96/028* (2013.01); *F16B 12/18* (2013.01)

(58) Field of Classification Search
CPC .... A47B 63/00; A47B 96/028; A47B 47/00; A47B 47/04; A47B 47/021; A47B 47/022; A47B 47/024
See application file for complete search history.

(56) References Cited

U.S. PATENT DOCUMENTS

| | | | |
|---|---|---|---|
| 910,616 A | 1/1909 | Waters | |
| 3,527,175 A * | 9/1970 | Kapnek ..................... | A47B 5/02 108/152 |
| 3,589,784 A | 6/1971 | Winkels | |
| 4,290,530 A * | 9/1981 | Wooster .................. | A47F 7/146 211/186 |
| 4,381,715 A * | 5/1983 | Forman ................ | A47B 96/066 108/102 |
| 4,541,600 A * | 9/1985 | Vieglins ................. | A47B 57/18 211/186 |
| 4,819,814 A * | 4/1989 | Fogelgren ............... | A47F 7/146 211/133.1 |

(Continued)

FOREIGN PATENT DOCUMENTS

| | | | |
|---|---|---|---|
| CH | 521106 A * | 4/1972 | ............. A47B 47/04 |
| DE | 19620793 A1 * | 11/1997 | ........... A47B 47/021 |

(Continued)

OTHER PUBLICATIONS

International Search Report, Italian Patent Application No. MI2014001405 dated Mar. 17, 2015.

*Primary Examiner* — Stanton L Krycinski
(74) *Attorney, Agent, or Firm* — Arent Fox LLP

(57) ABSTRACT

Structure of furnishing element, in particular of a bookcase, having a first upright having an outer surface and an opposite inner surface; at least one inner shelf delimited by a first lateral end having a first abutment surface; at least a first engagement portion retained in the at least one inner shelf; at least a first cantilever bar adapted to be mounted transversely from the outer surface of the first upright, the first cantilever bar including an abutment surface adapted to abut on the outer surface of the first upright; at least a first threaded connection element adapted to connect the first cantilever bar and the first engagement portion so that the abutment surface of the cantilever bar and the first abutment surface of the at least one shelf are drawn respectively against the outer and inner surfaces of the first upright on opposite sides to the first upright.

9 Claims, 9 Drawing Sheets

(56) References Cited

U.S. PATENT DOCUMENTS

| | | | | |
|---|---|---|---|---|
| 4,898,355 A | * | 2/1990 | Steinway | A47B 96/062 211/90.01 |
| 6,135,033 A | * | 10/2000 | Deferrari | A47F 5/116 108/165 |
| 6,164,610 A | * | 12/2000 | Santiago | A47B 96/066 211/90.01 |
| 7,946,664 B2 | * | 5/2011 | Vail | A47B 43/02 108/157.14 |

FOREIGN PATENT DOCUMENTS

| | | | | |
|---|---|---|---|---|
| DE | 196 50 815 A1 | | 4/1998 | |
| FR | 2 711 046 A1 | | 4/1995 | |
| GB | 857337 A | * | 12/1960 | A47B 47/022 |
| WO | WO 03/015578 A1 | | 2/2003 | |

\* cited by examiner

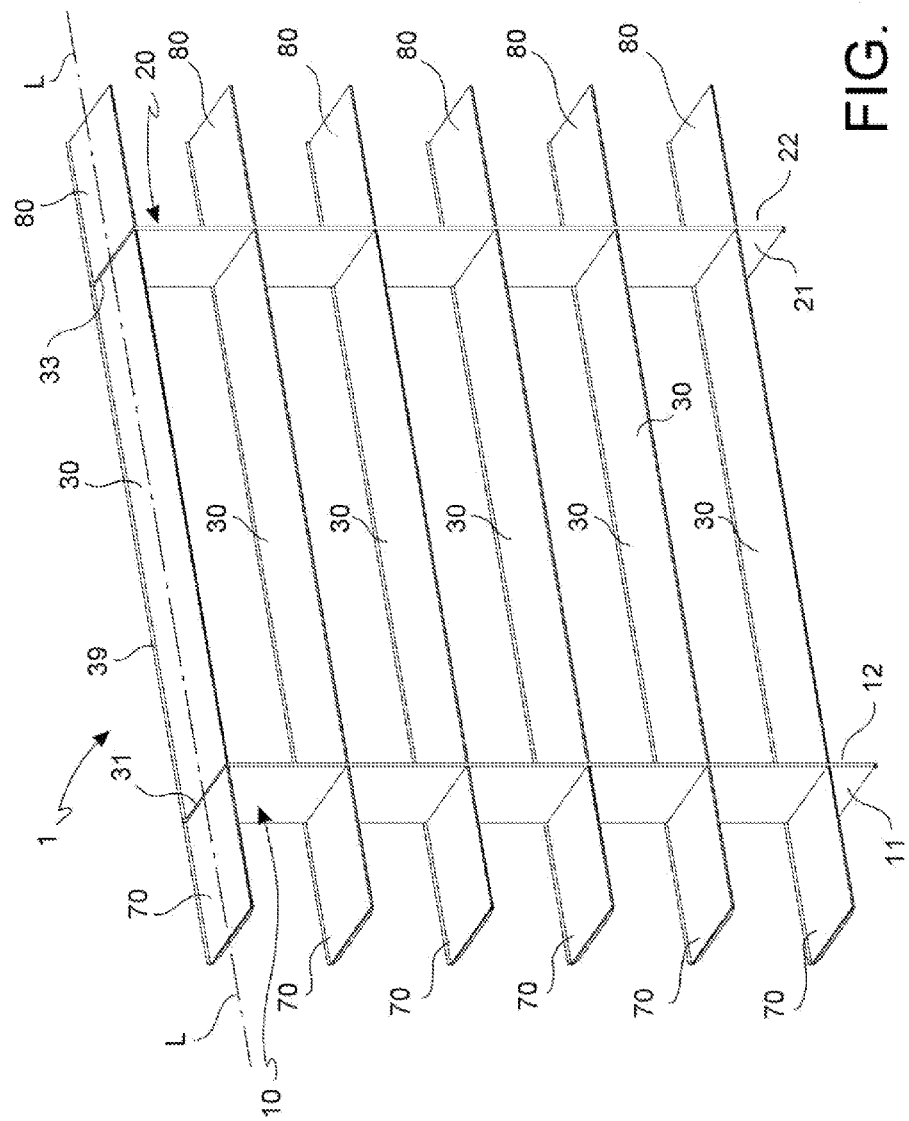

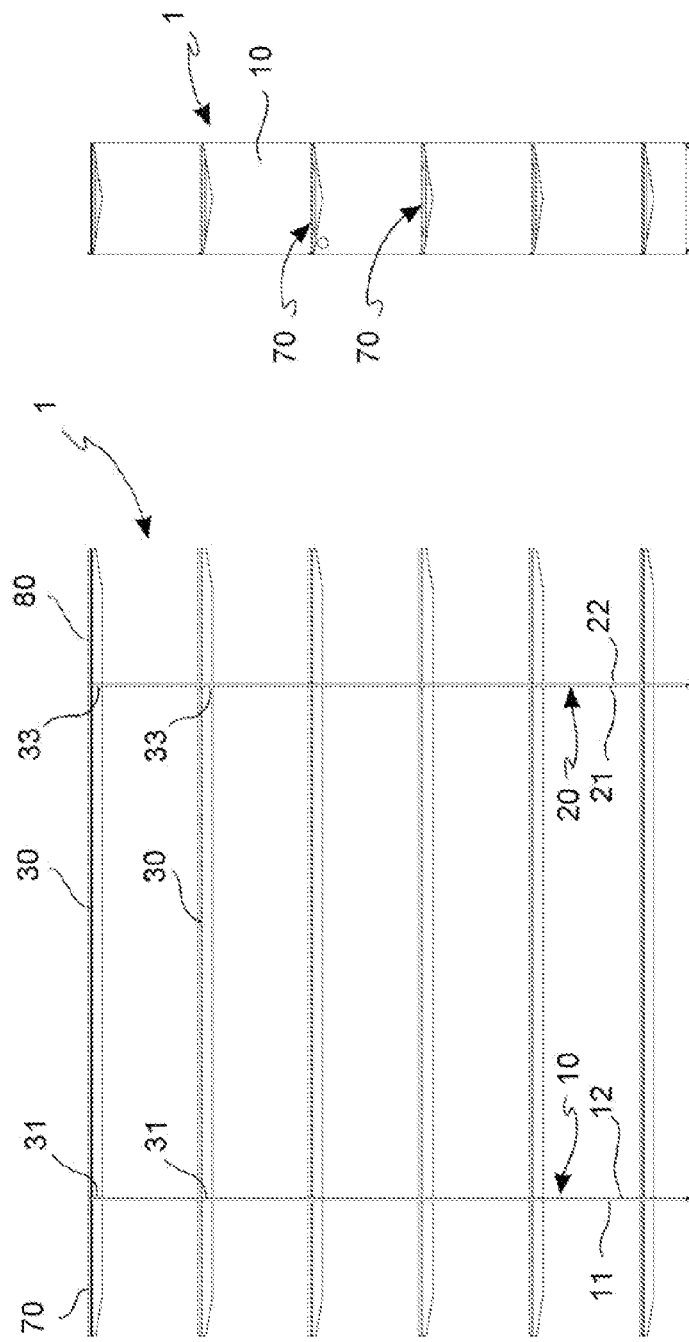
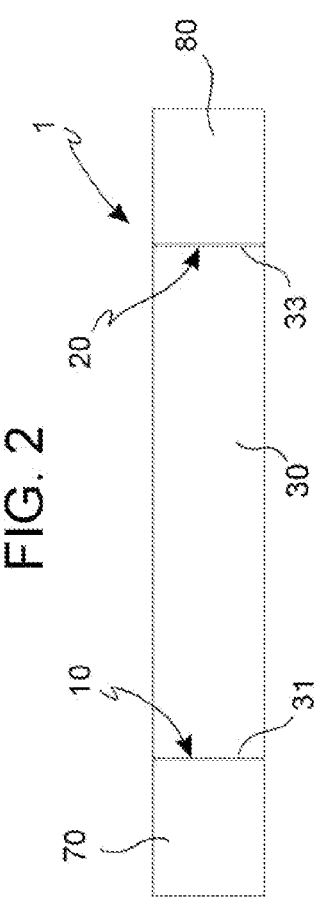

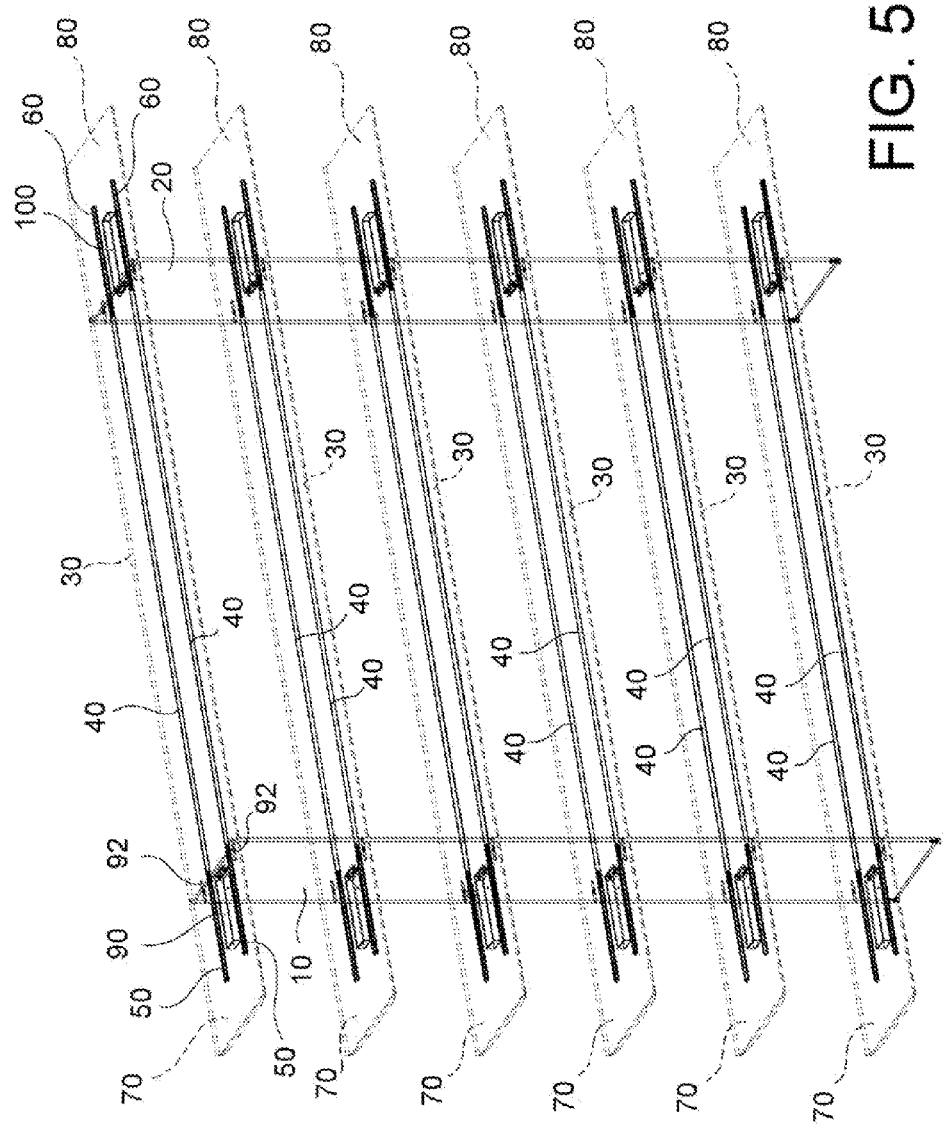

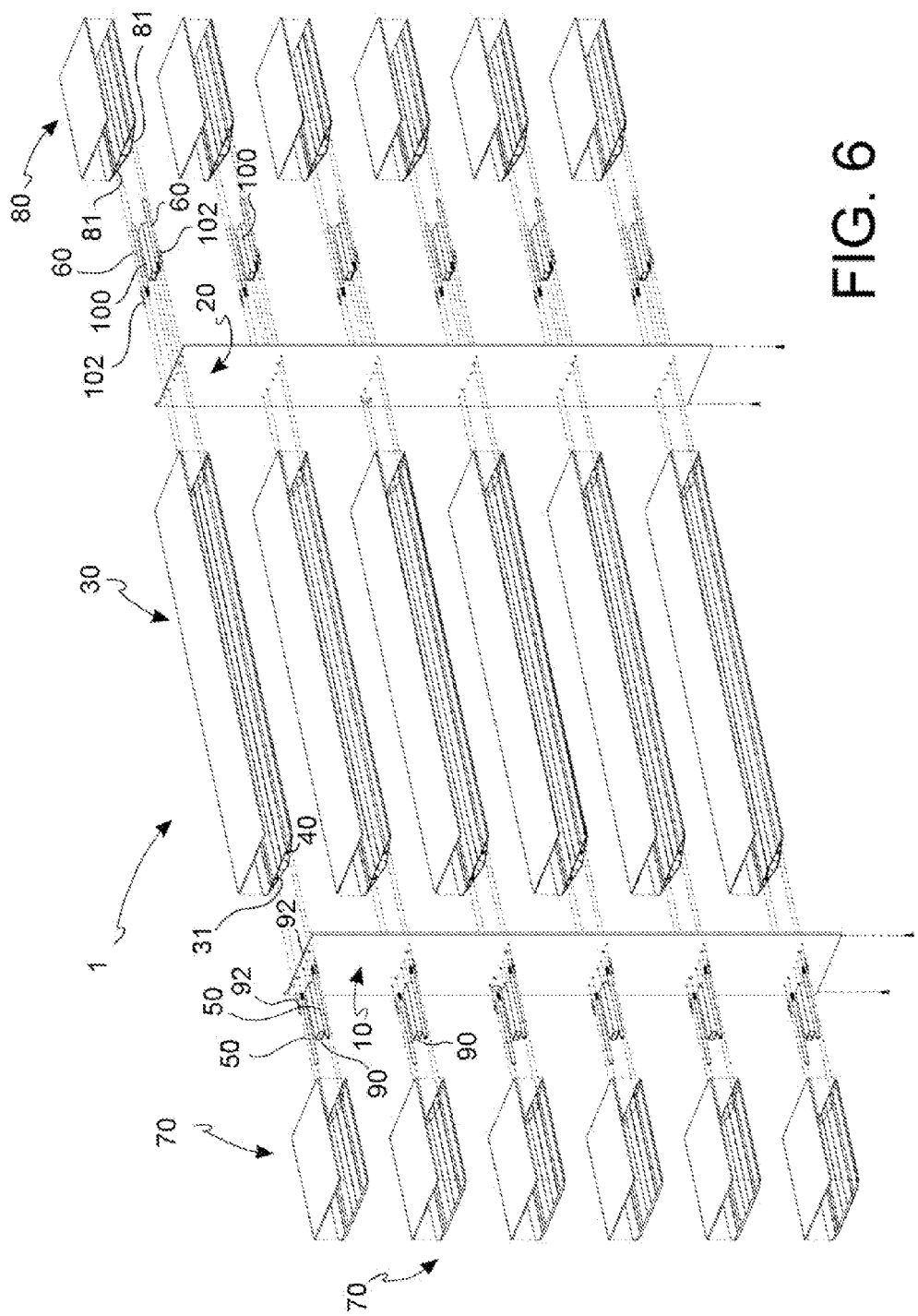

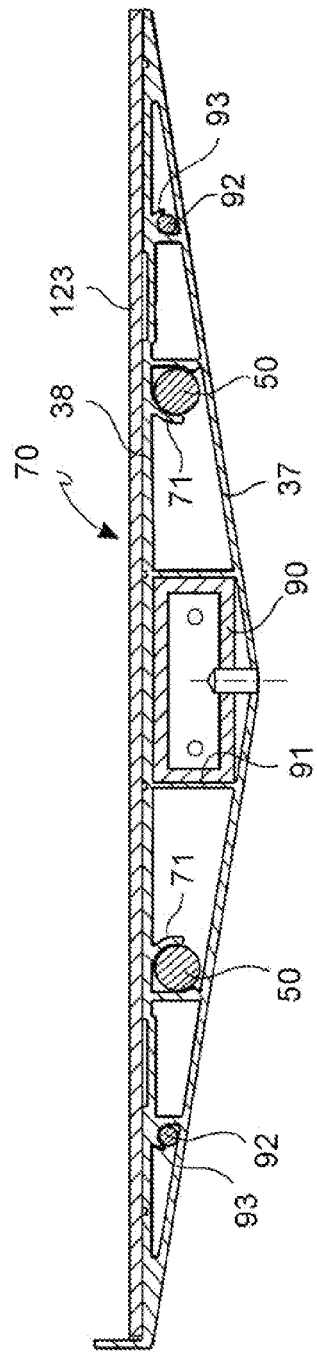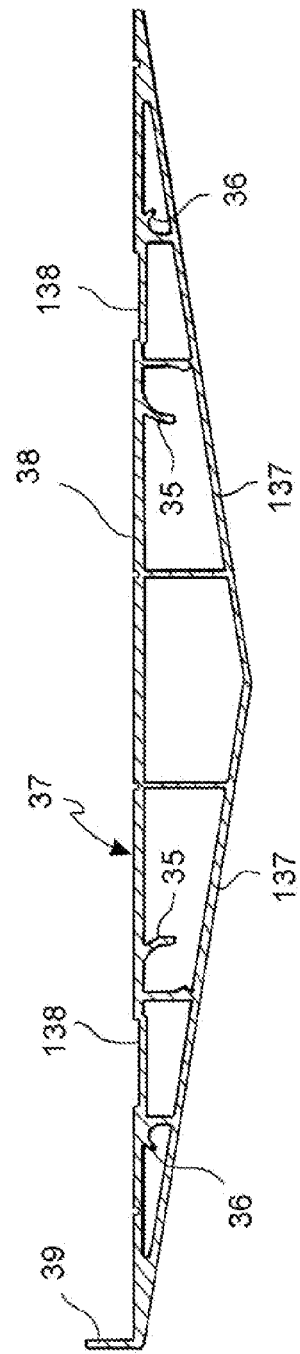

BOOKCASE STRUCTURE

CROSS-REFERENCE TO RELATED APPLICATIONS

This application is based upon and claims the benefit of priority of the Italian Patent Application No. MI2014A001405, filed Jul. 31, 2014. The disclosure of the prior application is hereby incorporated in its entirety by reference.

FIELD OF THE INVENTION

The present invention relates to a structure of a furnishing element, in particular to a bookcase, having at least one upright adapted to be arranged vertically in use, and at least one shelf mounted transversely to the upright, adapted to be arranged substantially horizontally in use.

More particularly, the invention relates to a bookcase adapted to be resting on a floor.

BACKGROUND ART

In the field of furniture industry, in particular of valuable furniture, the need to provide furniture elements having a linear and minimalist appearance and a particular aesthetic lightness, which at the same time have a high structural solidity, is increasingly felt.

This need is particularly felt in the field of bookcases, which must be designed to stably withstand weights of high intensity, such as those of a large number of books arranged on the shelves of the bookcase.

As mentioned above, the aesthetic needs of a valuable bookcase require that such a high structural stability is obtained by means of a seemingly light and thin structure. These two requirements are clearly conflicting.

A technique is known of reinforcing the structure of a cabinet having uprights and shelves by means of back panels which fit between superimposed shelves and between the uprights of the structure, but as mentioned above, this solution clashes with the need to provide a structure with a clean and minimalist appearance. On the contrary, the quality design requires providing a self-supported structure without back panels. In addition, the presence of back panels would prevent arranging the bookcase in a central area of a room since the back panel of the bookcase would be a visual hindrance between the two sides of the room separated by the bookcase. On the contrary, when the bookcase is not leaning against a wall but positioned at the center of a room, it should be accessible from both opposite directions of approach to the same.

Another known technique for reinforcing a structure formed by uprights and shelves and without a back panel is to reinforce the structure with tie-rods having ends fixed to different elements of the structure, between the edges of the structure itself to prevent the relative rotation between uprights and shelves.

It is clear that this solution also contrasts with the needs dictated by the quality design.

Among the other things, the quality design cannot envisage the use of visible reinforcement brackets between uprights and shelves.

These needs of reinforcing the structure of a cabinet adapted to withstand high weights are amplified if the structure of the bookcase includes shelves mounted as cantilever shelf starting from an upright. In these circumstances in which the shelf is fitted only at one end thereof and has the opposite free end not supported, the stresses which weigh on the fixing area of the shelf to the upright are the most severe. This stress increases proportionally to the distance of the point of application of the load on the shelf with respect to the upright.

Therefore, it is a problem particularly felt to improve the solidity of the structure of a piece of furniture, or of a bookcase, in order to withstand high static stresses avoiding any reinforcement element visible from the outside. Even more deeply felt is the need to provide a reinforced bookcase having cantilever shelves of long arm, avoiding any reinforcement device visible from the outside.

SUMMARY OF THE INVENTION

An object of the present invention is to devise and provide a furnishing element, for example a bookcase, which allows satisfying the above requirements and obviating at least partially the drawbacks mentioned above with reference to the prior art.

In particular, an object of the present invention is to provide a structure of a furnishing element, or a bookcase, able to reconcile the conflicting requirements of high aesthetic lightness and high structural strength.

A particular object is to provide a structure of bookcase able to guarantee a high rigidity of connection between the upright and the shelves, avoiding any external and visible reinforcement member, for example avoiding the need for a back structural panel interposed between uprights and shelves for preventing the relative rotation, or for example, avoiding any flexible tie-rod which connects uprights and shelves or other elements to one another, for preventing the relative rotation.

A further object of the present invention is to provide a structure of a furnishing element, or bookcase, having shelves mounted cantilever projecting from the upright, also with a long arm, while ensuring a high mechanical resistance to the weight of objects that weigh on the shelf.

These and further objects and advantages are achieved through a furnishing element structure, in particular of a bookcase, including a first upright, or first shoulder, having an outer surface and an opposite inner surface; at least one shelf adapted to be mounted to said first side upright transversely to said inner surface, wherein said at least one shelf extends along a longitudinal direction and has a first end comprising a first abutment surface adapted to abut against said inner surface of the first upright; at least one first engagement portion retained in said at least one shelf, which culminates on said first end remaining rearward in relation to said first abutment surface towards the inside of the at least one shelf, by a predefined rearward length in the longitudinal direction; at least one first cantilever bar adapted to be mounted transversely from the outer surface of the first upright, aligned with said first engagement portion, said first cantilever bar including an abutment surface adapted to abut on the outer surface of the first upright; at least one first threaded connection element free to slide in a through hole that crosses said first upright, adapted to connect said first cantilever bar and the first engagement portion so that, by screwing the first threaded connection element, the abutment surface of the cantilever bar and the first abutment surface of the at least one shelf are drawn respectively against the outer and the inner surfaces of the first upright on opposite sides to the first upright.

Advantageously, the provision of an engagement portion retained within the shelf and which culminates in the first end remaining rearward in relation to the abutment surface, and the provision of a cantilever bar adapted to be mounted aligned with said first engagement portion and comprising an abutment surface adapted to abut on the outer surface of the upright, connected to the first engagement portion through a threaded connection element free to slide into a through hole in the upright, enables a high clamping force between the cantilever bar projecting laterally outwards and the shelf, keeping the upright interposed and clamped between bar and shelf. The cantilever bar draws the engagement portion towards the upright, the engaging portion being retained in the shelf at a distance from the inner surface of the upright. This allows the application of a high clamping rotation strength on the cantilever bar to compress the abutment surface of the side end of the shelf against the inner surface of the upright, preventing any further relative movement therebetween. This is a very rigid connection which does not allow any yield of the connection between upright and shelf.

The cantilever bar is designed to support a side cantilever shelf. The cantilever bar is mounted aligned with the engagement portion retained in the shelf. This means that a force applied transversely to the cantilever bar, for example the weight force applied by the books on the side cantilever shelf, urges the bar itself to bending, which is abundantly opposed both by the stiffness of the upright and also and above all by the opposite stress applied by the weight force on the shelf arranged on the side opposite to the cantilever shelf, to which the bar is connected via the threaded connection element.

In other words, the outer shelf and the inner shelf connected to each other via the threaded connection element auto-balance the weight forces applied onto the same, imparting a very high sturdiness to the structure.

According to an advantageous embodiment, the presence of a second upright having an inner surface facing the inner surface of the first upright and an opposite outer surface, wherein the shelf has a second opposite end comprising a second abutment surface adapted to abut against said inner surface of the second upright and having a second engagement portion retained into the shelf which culminates on the second end remaining rearward with respect to said second abutment surface by a rearward length, wherein the structure has a second cantilever bar aligned with the second engagement portion and comprising an abutment surface adapted to abut on the outer surface of the second upright connected to the second engagement portion through a second threaded connection element, involves the technical effect of an even greater balancing of forces, since the forces applied on the inner shelf would auto-balance with those applied to the end bars connected to both the opposite ends of the inner shelf.

Moreover, according to a preferred embodiment, if the two coupling portions retained in the inner shelf are the ends of a same rigid tie-rod housed in the shelf, there is the further advantageous effect that the clamping of the two cantilever bars connected to the tie-rod through the respective threaded connection elements strongly pulls the two uprights in mutual approach, compressing the interposed inner shelf therebetween, providing an even more robust structure.

The resulting structure is self-balanced, requires no reinforcement member and has a very high structural strength, allowing considerably withstanding the significant weight of the books placed on the shelves without visually deforming, allowing the use of inner shelves of more than 200 cm in length, and side cantilever shelves with over 60 cm of cantilever compared to the upright.

According to an advantageous embodiment, the cross-section orthogonal to the longitudinal direction of the at least one inner shelf has a thickness decreasing starting from a central area of the shelf to a front edge and to a rear edge of the at least one shelf. In this way, the structure of the furnishing element, or bookcase, appears light-looking as the observer first sees the front edge of the shelf, which is rather thin and does not see the thickness of the central area of the shelf that is rearward in relation to the front edge. Moreover, since the thickness of the at least one shelf in a central area thereof is maximum, the shelf opposes a bending thereof downwards.

BRIEF DESCRIPTION OF THE FIGURES

Various embodiments of the invention are described hereafter through embodiment examples given only as a non-limiting indication with reference in particular to the accompanying figures, in which:

FIG. 1 shows a perspective view of an example of structure of furnishing element or bookcase according to the invention;

FIGS. 2 to 4 show the structure in FIG. 1 in a front view, a side view, and a top view, respectively;

FIG. 5 shows the structure in FIG. 1, where all the shelves are represented with dotted lines showing the inner components of the structure in transparency;

FIG. 6 shows an exploded drawing of the structure in FIG. 1;

FIG. 10 shows a cross section through a section plane X, of a side cantilever shelf of the structure in FIG. 8;

FIG. 11 shows a cross section of an extruded metal profile for forming an inner shelf and a side cantilever shelf of the structure in FIG. 8;

DESCRIPTION OF SOME PREFERRED EMBODIMENT EXAMPLES

Figure 7:
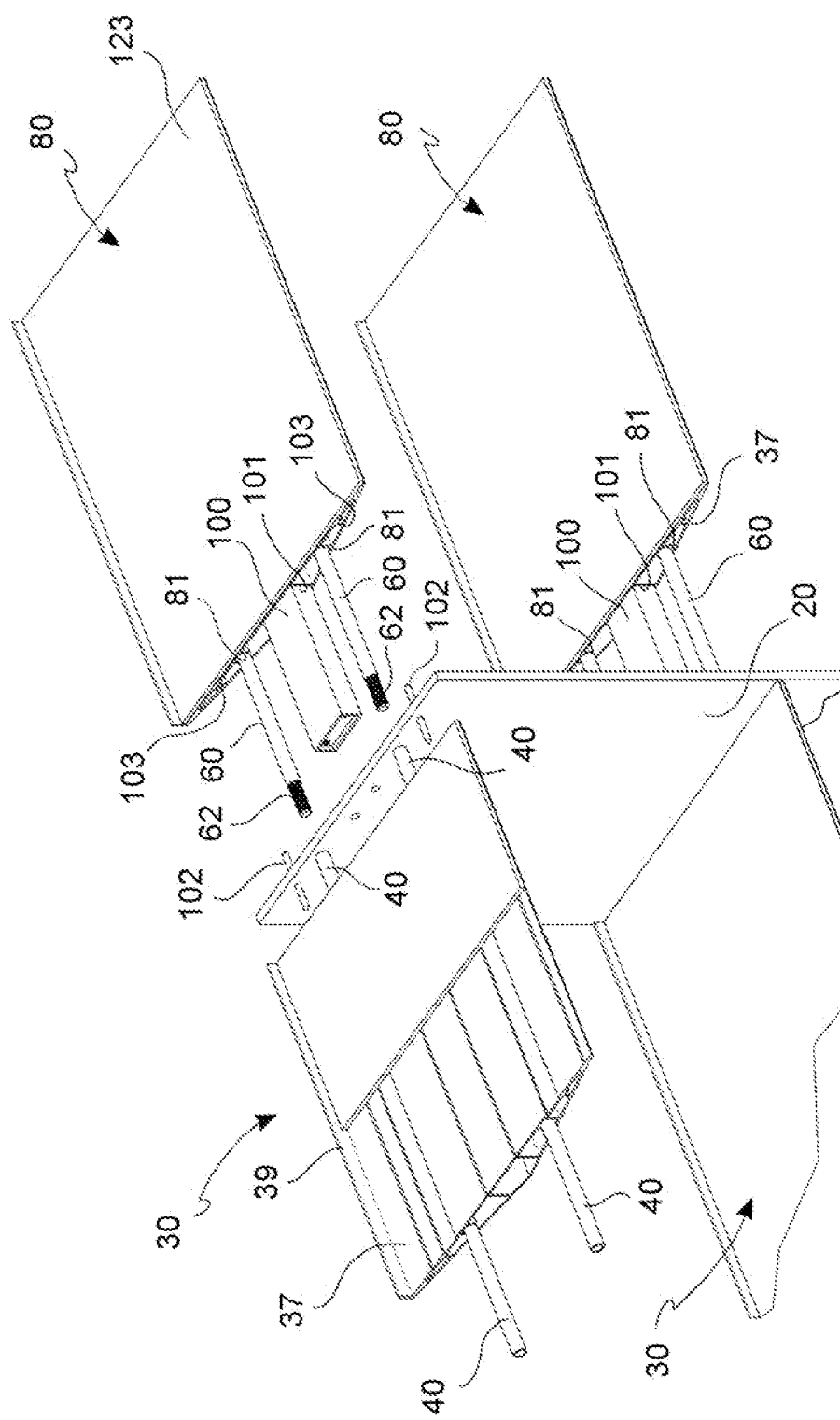
FIG. 7 shows a mounted detail of the structure in FIG. 1.
Figure 8:
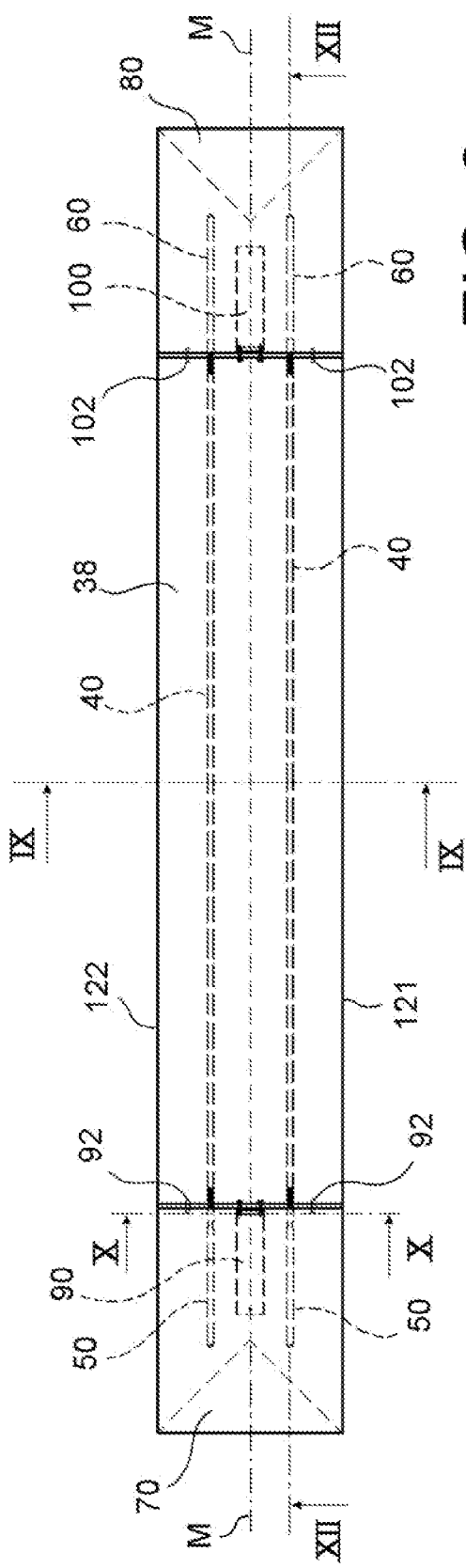
FIG. 8 shows a top view of the structure in FIG. 1, in which the inner components are represented with dotted line.

Below, reference will be made to "longitudinal direction" to indicate a main direction of development of a shelf. The opposite side ends of the shelf are transversal, for example orthogonal or inclined, with respect to such a direction.

According to an embodiment, the shelf is an extruded profile, for example metal extruded profile. In this case, the longitudinal direction of the shelf is parallel or coincident with the direction of extrusion of the profile.

With reference to the figures, a structure of furnishing element, for example a bookcase according to the invention, is indicated as a whole with reference numeral 1.

The structure of furnishing element comprises a first upright 10, or first shoulder, having an outer surface 11 and an opposite inner surface 12, and at least one inner shelf 30 mounted to said first side upright 10 transversely to the inner surface 12.

The at least one inner shelf 30 extends along a longitudinal direction L-L and has a first end 31 comprising a first abutment surface 32 transversal to the longitudinal direction L-L, for example orthogonal or oblique to the longitudinal direction L-L, adapted to abut against the inner surface 12 of the first upright 10.

The structure of furnishing element 1 further comprises at least a first engagement portion 41 retained within said at least one shelf 30, which culminates on said first end 31 remaining rearward in relation to the first abutment surface 32 towards the inside of the at least one shelf 30, by a rearward length d1 in longitudinal direction L-L. Such a length is, for example, greater than 1 mm, preferably about 3 mm. This allows putting the at least one threaded connection element in elastic tension between cantilever bar and shelf.

The structure of furnishing element 1 further comprises at least one first cantilever bar 50 suitable to be mounted transversely from the outer surface 11 of the first upright 10, aligned with said first engagement portion 41 on the side opposite to the first upright, said first cantilever bar 50 comprising an abutment surface 51 suitable to abut on the outer surface 11 of the first upright 10.

According to an embodiment, the cantilever bar is a metal rod, for example of steel.

Structure 1 comprises at least a first threaded connection element 52 free to slide in a through hole 13 which crosses said first upright 10 and which connects the first cantilever bar 50 and the first engagement portion 41 so that, by screwing the first threaded connection element 52, the abutment surface 51 of the cantilever bar 50 and the first abutment surface 32 of the at least one shelf 30 are drawn respectively against the outer 11 and inner 12 surfaces of the first upright 10 on opposite sides of the first upright 10.

According to an embodiment, the at least one first threaded connection element 52 comprises an externally threaded pin 53 attached coaxially to said at least one first cantilever bar 50 so as to project from said first abutment surface 51, and said at least one first engagement portion 41 comprises an inner thread 43 suitable to receive the threaded pin 53.

For example, the externally threaded pin 53 can be attached to one end of the cantilever bar, for example welded, or partially inserted into a coaxial cavity in the free end of the cantilever bar and then locked by plastic deformation of the end of the cantilever bar. Or, the externally threaded pin 53 can be made integral with the cantilever bar, e.g. by machining at tool machines.

Since clamping the first threaded connection element requires rotating the cantilever bar 50 about its axis in relation to the engagement element 41, the first cantilever bar 50 includes at least one side leveling 54 to allow engagement with a screwing wrench to transmit a desired torque to the first cantilever bar 50.

According to an embodiment, the at least one first threaded connection element 52 includes an externally threaded pin 53 attached to said at least a first engagement portion 41, protruding from the at least one shelf in relation to the first abutment surface 32, in order to cross the through hole 13 of the first upright and protrude from the opposite side.

In this case, the first cantilever bar 50 has an internally threaded hole coaxial with the bar and which goes into the first cantilever bar starting from the abutment surface 51.

Also in this case, in order to clamp the threaded element, the first cantilever bar must be rotated about its axis.

According to an embodiment, the structure of furnishing element comprises a second upright 20, or second shoulder, having an inner surface 21 facing said inner surface 12 of the first upright 10, and an outer surface 22 opposite the inner surface 21, wherein said at least one shelf 30 has a second end 33, opposite the first end 31 and comprising a second abutment surface 34 suitable to abut against said inner surface 21 of the second upright 20.

According to an embodiment, the structure 1 comprises at least one second engagement portion 42 retained within said at least one inner shelf 30, which culminates on said second end 33 of the inner shelf 30 remaining rearward in relation to said second abutment surface 34 towards the inside of the at least one inner shelf 30 by a predefined rearward length d2 in the longitudinal direction L-L.

According to an embodiment, the structure 1 comprises at least one second cantilever bar 60 suitable to be mounted transversely to the outer surface 22 of the second upright 20, aligned with said second engagement portion 42, said second cantilever bar 60 comprising an abutment surface 61 suitable to abut on the outer surface 22 of the second upright 20.

According to an embodiment, the structure 1 comprises at least one second threaded connection element 62 free to slide in a through hole 23 which passes through said second upright 20 suitable to connect the second cantilever bar 60 and the second engagement portion 42 so that, by screwing the second threaded connection element 62, the abutment surface 61 of the cantilever bar 60 and the second abutment surface 34 of the at least one shelf 30 are drawn respectively against the outer 22 and inner 21 surfaces of the second upright 20 on opposite sides to the second upright 20.

In particular, the at least one second cantilever bar 60 is a metal rod, for example of steel.

The structure 1 comprises at least one second threaded connection element 62 free to slide in a through hole 23 through the second upright 20 and which connects the second cantilever bar 60 and the second engagement portion 42 so that by screwing the second threaded connection element 62, the abutment surface 61 of the cantilever bar 60 and the second abutment surface 34 of the at least one shelf 30 are drawn respectively against the outer 22 and inner 21 surfaces of the second upright 20 on opposite sides of the second upright 20.

According to an embodiment, the at least one second threaded connection element 62 comprises an externally threaded pin 63 attached coaxially to said at least one second cantilever bar 60 so as to project from said second abutment surface 61, and said at least one second engagement portion 42 comprises an inner thread 44 suitable to receive the threaded pin 63.

For example, the second externally threaded pin 63 may be attached to one end of the second cantilever bar 60, for example welded, or partially inserted into a coaxial cavity in the free end of the second cantilever bar 60 and then locked by plastic deformation of the end of the second cantilever bar 60. Or, the externally threaded pin 63 can be made integral with the second cantilever bar, e.g. by machining at the tool machines.

Since clamping the second threaded connection element requires rotating the second cantilever bar 60 about its axis in relation to the second engagement portion 42, the second cantilever bar 60 includes at least one side leveling 64 for allowing the engagement with a screwing wrench to transmit a desired torque to the second cantilever bar 60.

According to an embodiment, the at least one second threaded connection element 62 includes an externally threaded pin 63 attached to said at least a second engagement portion 42, protruding from the at least one inner shelf 30 in relation to the second abutment surface 34, so as to cross the through hole 23 of the second upright and protrude from the opposite side.

In this case, the second cantilever bar 60 has an internally threaded hole coaxial with the bar and which goes into the bar starting from the abutment surface 61 of the second cantilever bar 60.

Also in this case, in order to clamp the threaded element, the cantilever bar must be rotated about its axis.

According to an embodiment, the at least one second cantilever bar 60 is equal to the at least one first cantilever bar 50.

According to an embodiment, the first engagement portion 41 and the second engagement portion 42 are the opposite ends of a rigid tie-rod 40, for example arranged parallel to the longitudinal axis L-L inside the at least one shelf 30.

According to an embodiment, the at least one tie-rod 40 has a length b less than distance D between the first abutment surface 32 and the second abutment surface 34 of the at least one shelf 30 at the tie-rod 40.

For example, the tie-rod 40 is a rod, for example a metal rod, having at both free ends respective inner threads 43 and 44 to receive the respective threaded connection elements 52 and 62.

When structure 1 is mounted, the at least one first cantilever bar 50 is aligned with a respective tie-rod 40 and with a respective second cantilever bar 60 on a side opposite to the tie-rod, for example according to a common development axis parallel to the longitudinal direction L-L.

According to an embodiment, the at least one inner shelf 30 comprises at least one rod seat 35 which extends along the longitudinal direction L-L to receive a respective one of said at least one tie-rod 40.

In particular, the tie-rod 40 is free to slide in the rod seat 35 in longitudinal direction L-L.

In this way, the advantage of allowing the settling of the tie-bar within the rod seat 35 is obtained. Therefore, in this case, the rod seat 35 has a function of sliding guide in a direction parallel to the longitudinal direction L-L.

Moreover, since the tie-rod 40 is free to slide in the rod seat 35, the tie-rod 40 can extend elastically due to the effect of the tensile stress by the first cantilever bar 50 and the second cantilever bar 60. In this way, the elastic retaining action exerted by the tie-rod 40 on structure 1 allows elastically reacting to any external actions transversal to structure 1, preventing any loosening of the assembled components.

When the first cantilever bar 50 and the second cantilever bar 60 are screwed in relation to the tie-rod 40, they transmit a tensile stress to the tie-rod due to the interposition of the shelf between the two uprights.

In other words, the clamping of such a structure 1 by clamping the first cantilever bar 50 and the second cantilever bar 60 ensures at the same time:

the clamping of the first upright 10 between the first cantilever bar 50 and the inner shelf 30;

the clamping of the second upright 20 between the inner shelf and the second cantilever bar;

the clamping of the inner shelf between the first upright and second upright.

Such a situation imparts an unquestionable high sturdiness to the structure. Such a sturdiness is achieved through a simple mounting operation, which is only the clamping of the first cantilever bar 50 and of the second cantilever bar 60 to the tie-rod 40.

According to an embodiment, structure 1 includes at least one first lateral cantilever shelf 70 mounted so as to project from said outer surface 11 of the first upright 10, aligned with said at least one shelf 30 on the side opposite to inner shelf 30 in relation to the first upright 10.

The at least one first cantilever bar 50 is configured to support a respective first and second lateral shelf.

According to an embodiment, the at least one first lateral cantilever shelf 70 comprises at least one first seat 71 for cantilever bar for slidably receiving said first cantilever bar 50 within the encumbrance of the first lateral cantilever shelf 70.

In other words, the at least one first cantilever bar 50 remains in use completely hidden inside the respective first lateral cantilever shelf 70.

According to an embodiment, the at least one first seat for cantilever bar is arranged in use parallel to the longitudinal direction L-L.

According to an embodiment, structure 1 includes at least one second lateral cantilever shelf 80 adapted to be mounted so as to project from said outer surface 22 of the second upright 20, aligned with said at least one shelf 30 on the side opposite to shelf 30 in relation to the second upright 20.

According to an embodiment, the at least one second lateral cantilever shelf 80 comprises at least one cantilever bar second seat 81 for slidably receiving said second cantilever bar 60 within the encumbrance of the second lateral cantilever shelf 80.

In other words, the at least one second cantilever bar 60 remains in use completely hidden inside the respective second lateral cantilever shelf 80.

According to an embodiment, the at least one cantilever bar second seat 81 is arranged in use parallel to the longitudinal direction L-L.

According to an embodiment, the structure 1 comprises at least one first cantilever beam 90 suitable to be attached to the first upright 10 so as to project from said outer surface 11 so as to fall within the encumbrance of the first lateral cantilever shelf 70, said first lateral cantilever shelf 70 including a first inner seat 91 configured to slidably receive said first cantilever beam 90.

According to an embodiment, the first cantilever beam 90 develops in a direction parallel to the longitudinal direction L-L.

According to an embodiment, the first inner seat 91 has a cross section such as to allow a shape coupling with said first cantilever beam 90, so as to prevent a relative rotation of the first outer lateral shelf with respect to the first upright, for example about an axis parallel to the longitudinal direction.

According to an embodiment, the first cantilever beam 90 has a rectangular cross section.

According to an embodiment, the at least one first lateral cantilever shelf 70 comprises at least two cantilever bar first seats 71 and the first inner seat 91 is centrally interposed between said two cantilever bar first seats 71.

According to an embodiment, the structure 1 comprises at least one second cantilever beam 100 suitable to be attached to the second upright 20 so as to project from said outer surface 22 so as to fall within the encumbrance of the second lateral cantilever shelf 80, said second lateral cantilever shelf 80 including a second inner seat 101 configured to slidably receive said second cantilever beam 100.

According to an embodiment, the second cantilever beam 100 develops in a direction parallel to the longitudinal direction L-L.

According to an embodiment, the second inner seat 101 has a cross section such as to allow a shape coupling with said first cantilever beam 100, so as to prevent a relative rotation of the second outer lateral shelf 80 with respect to the second upright 20, for example about an axis parallel to the longitudinal direction L-L.

According to an embodiment, the second cantilever beam 100 has a rectangular cross section.

According to an embodiment, the at least one second lateral cantilever shelf 80 comprises at least two cantilever bar second seats 81 and the first inner seat 101 is centrally interposed between said two cantilever bar second seats 81.

According to an embodiment, the structure 1 comprises at least a first reference pin 92 arranged passing through said first upright 10 so as to project from both said outer surface 11 and from said inner surface 12 of said first upright.

According to an embodiment, the at least one shelf 30 comprises at least one reference pin longitudinal seat 36 for the engagement with a portion of said first reference pin 92.

According to an embodiment, the at least one first lateral cantilever shelf 70 comprises at least one reference pin longitudinal seat 93 adapted to accommodate a remaining portion of said first reference pin 92.

According to an embodiment, the structure 1 comprises at least a second reference pin 102 arranged passing through said second upright 20 so as to project from both said outer surface 22 and from said inner surface 21 of said second upright 20.

According to an embodiment, the at least one inner shelf 30 comprises at least one reference pin longitudinal seat 36 for the engagement with a portion of said second reference pin 102.

According to an embodiment, the at least one second lateral cantilever shelf 80 has at least one reference pin longitudinal seat 103 adapted to accommodate a remaining portion of said second reference pin 102.

According to an embodiment, the at least one first lateral shelf 70 is substantially specular to the at least one second lateral shelf 80.

According to an embodiment, said at least one inner shelf 30 is defined by an upper supporting surface 38 defined by a front edge 121 and by a rear edge 122. For example, the rear edge 122 is parallel to the front edge and to the longitudinal direction L-L.

The at least one inner shelf 30 defines a median plane M-M orthogonal to a plane containing the first front edge 121 and the rear edge 122, and equidistant from the front edge 121 and from the rear edge 122.

According to an embodiment, the structure 1 comprises an even number of tie-rods 40 for said or each inner shelf 30, said tie-rods 40 being arranged in a symmetrical manner with respect to said median plane M-M.

In particular, the structure 1 may comprise two tie-rods 40 for said or each inner shelf 30, said two tie-rods 40 being arranged in a symmetrical manner with respect to said median plane M-M.

According to an embodiment, the two tie-rods 40 are equidistant from the median plane M-M.

Figure 9:
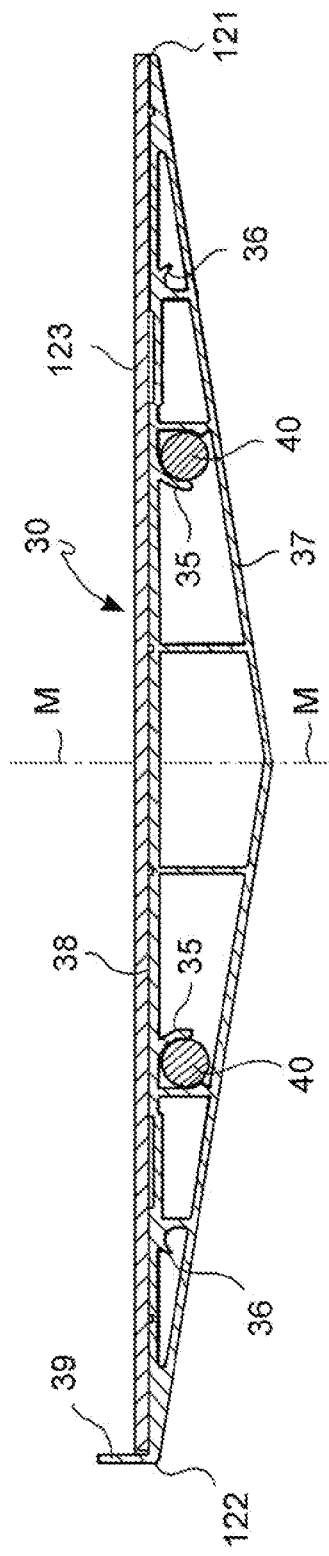
FIG. 9 shows a cross section through a section plan IX, of an inner shelf of the structure in FIG. 8.
Figure 12:
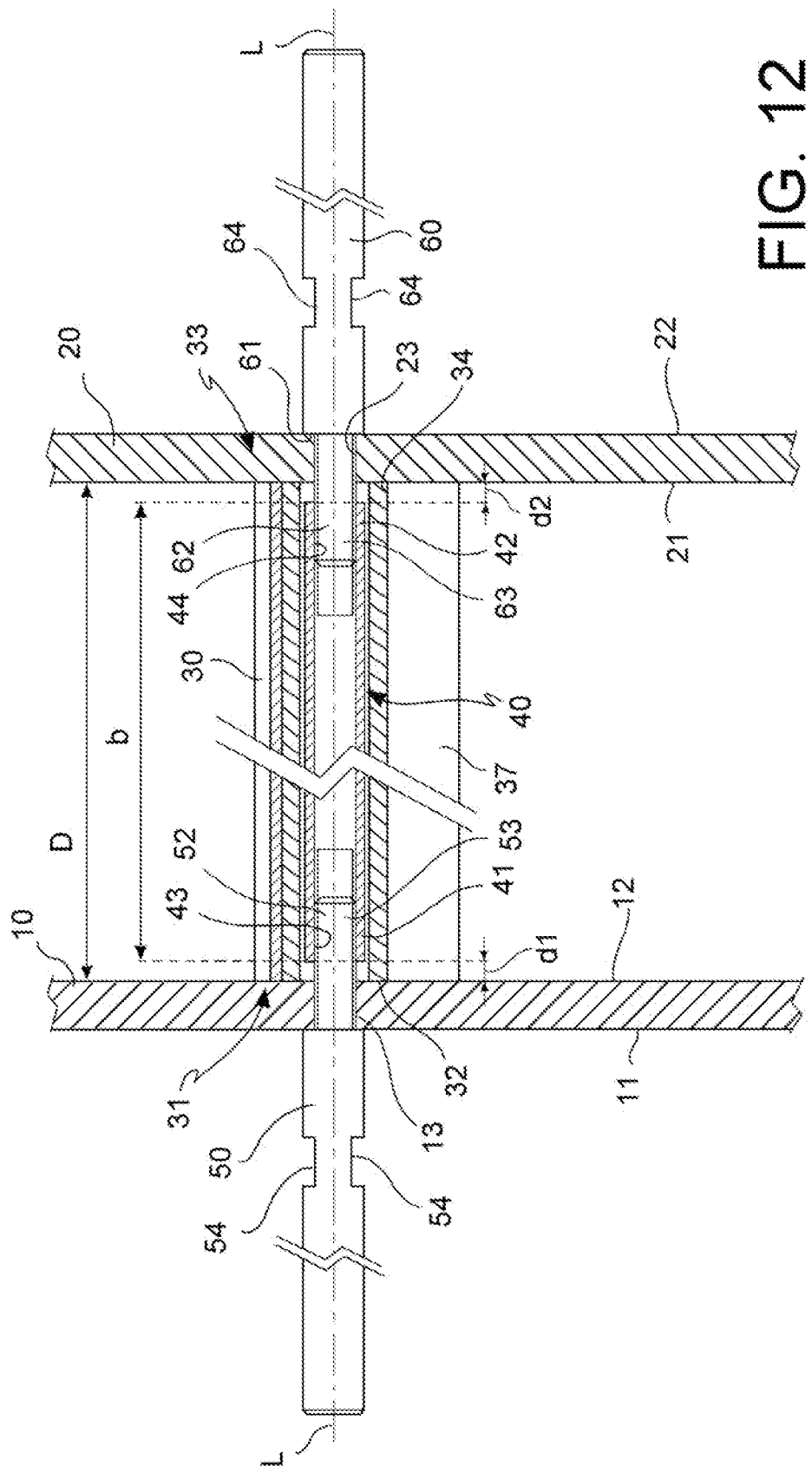
FIG. 12 shows a section of the structure in FIG. 8 through a longitudinal plane passing through the axis of the first and second cantilever bar.
Figure 13:
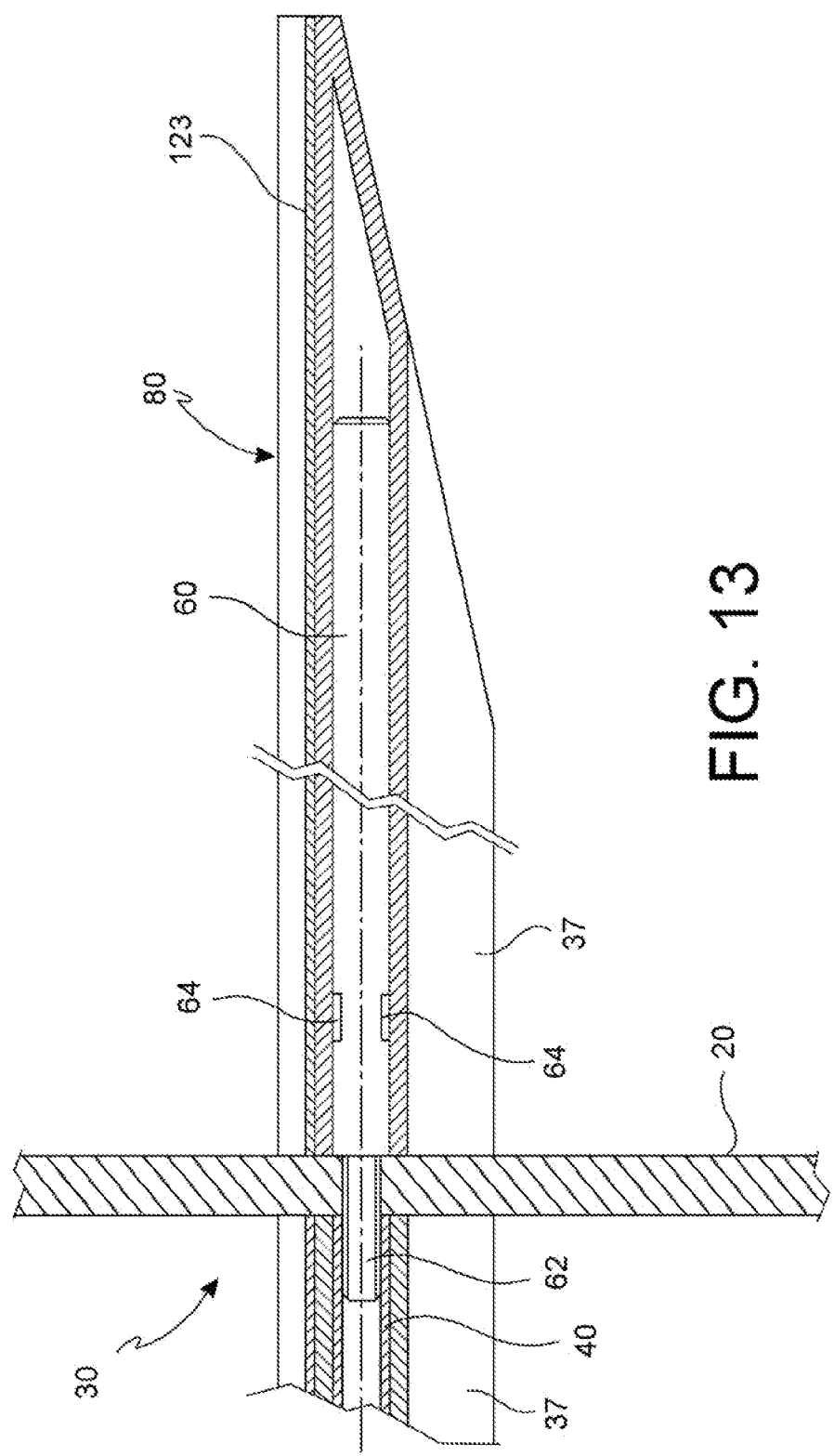
FIG. 13 shows a detail of the cross-section of the structure in FIG. 8 comprising a side cantilever shelf.

According to an embodiment, said at least one inner shelf 30 comprises an equal number of bar seats 35 which extend parallel to the longitudinal direction L-L to accommodate respective tie-rods 40 (FIG. 9), in particular said bar seats 35 are distributed symmetrically to the median plane M-M.

According to an embodiment, said bar seats 35 are specular to the median plane M-M.

According to an embodiment, said at least one inner shelf 30 comprises two bar seats 35 which extend parallel to the longitudinal direction L-L to accommodate two respective tie-rods 40 (FIG. 9), for example said two bar seats 35 are equidistant from the median plane M-M.

According to an embodiment, said two bar seats 35 are specular to the median plane M-M.

According to an embodiment, said at least one inner shelf 30 comprises two reference pin longitudinal seats 36 for the engagement with a portion of said first reference pin 92.

According to an embodiment, said two reference pin seats 36 are equidistant from the median plane M-M, for example they are specular to the median plane M-M.

According to an embodiment, the two reference pin seats 36 are arranged more distant from the median plane M-M with respect to the two rod seats 35. In other words, the rod seats 35 are arranged internally with respect to the reference pin seats 36.

Such a symmetrical structure with respect to a median plane allows balancing the forces applied by the at least one shelf, not only the bending stresses of the lateral shelves but also the stresses which would tend to rotate the shelves about a longitudinal direction.

According to an embodiment, the cross-section orthogonal to the longitudinal direction L-L of the at least one inner shelf 30 has a thickness decreasing starting from a central area of the shelf to a front edge 121 and a rear edge 122 of the at least one shelf 30. In this way, bookcase 1 appears light-looking since the observer who faces the shelves sees first the front edge 121 of the shelves which is very thin, avoiding to note the larger thickness in the central area which is connected to the front and rear edges.

According to an embodiment, the thickness of the cross-section orthogonal to the longitudinal direction L-L of the at least one shelf 30 at the center of the cross-section is at least 10 times less than the width of the shelf between the front edge 121 and rear edge 122, for example 12 times less than the width of the shelf between the front edge 121 and rear edge 122.

According to an embodiment, the cross-section orthogonal to the longitudinal direction L-L of the at least one shelf 30 is tapered towards the front edge, ending with a sharp edge.

According to an embodiment, the cross-section orthogonal to the longitudinal direction L-L of the at least one shelf 30 is substantially symmetrical to a median plane M-M parallel to the longitudinal direction and equidistant from a front edge 121 of shelf 30 and a rear edge of the shelf parallel to the front edge 121.

According to an embodiment, the cross-section orthogonal to the longitudinal direction L-L of the at least one shelf 30 has substantially the shape of an isosceles triangle, having a base defined by a flat upper surface of shelf 38 and two equal sides 137 defined by two lower inclined flat surfaces. In this way, the front edge 121 and the rear edge 122 are connected with the thicker central area of the shelf through inclined surfaces. Such inclined surfaces are beyond the view of an observer, who notes only the thin front edge 121.

According to an embodiment, the at least one shelf 30 comprises a longitudinal containment projection 39 which protrudes integrally from the rear edge 122, transversely to the flat upper surface 38 of the shelf and parallel to the longitudinal direction L-L, in particular it protrudes superiorly orthogonally to the flat upper surface 38. Such a projection prevents items placed on the shelf from going beyond the rear edge 122 of the shelf.

According to an embodiment, the structure 1 comprises a coating layer 123 glued to the upper surface 38 of the at least one shelf 30.

According to an embodiment, the structure 1 comprises a coating layer glued to an upper surface of the at least one first lateral shelf 70 and of the at least one second lateral shelf 80.

According to an embodiment, the coating layer 123 is of wood.

According to an embodiment, the at least one first lateral shelf 70 and the at least one second lateral shelf 80 have a cross-section equal in shape to the cross-section orthogonal to the longitudinal direction L-L of the at least one inner shelf 30. In other words, the cross-section of the at least one inner shelf 30 is equal to the cross-section of the at least one first lateral shelf 70 and is equal to the cross-section of the at least one second lateral shelf 80.

According to an embodiment, the at least one inner shelf 30 is an extruded metal profile 37, for example of aluminum, for example having extrusion direction parallel to the longitudinal direction L-L.

According to an embodiment, the extruded section 37 has a cross-section transversal to the longitudinal direction L-L substantially symmetrical to the median plane M-M.

According to an embodiment, the at least one first lateral cantilever shelf 70 comprises a portion of the extruded section having a cross-section equal to the cross-section of the extruded profile 37 of the at least one inner shelf 30.

According to an embodiment, the at least one second lateral cantilever shelf 80 comprises a portion of the extruded profile having a cross-section equal to the cross-section of the extruded profile 37 of the at least one inner shelf 30.

According to an embodiment, the at least one rod seat 35 is formed integrally with the extruded profile 37, in particular said at least one rod seat extending for the entire length of the extrusion, in particular completely inside the extruded profile 37. In other words, the at least one rod seat 35 is hidden from view from the outside.

According to an embodiment, the at least one reference pin seat 36 is formed integrally with the extruded profile 37, for example said at least one reference pin seat 36 extends for the entire length of the extrusion, for example completely inside the extruded section 37. In other words, the at least one reference pin seat 35 is hidden from view from the outside.

According to an embodiment, the extruded profile 37 has at least one longitudinal channel 138 facing an upper surface 38 of the profile to receive an adhesive for bonding the coating layer 123 on the extruded profile 37.

The structure described above from a point of view of technical features will now be described from the point of view of an assembling method thereof.

After inserting the tie-rods 40 inside the rod seats 35 of the at least one inner shelf 30, the first and second uprights are juxtaposed with the ends of the at least one inner shelf 30 by aligning the ends of the rod seats 35 with the through holes 13 and 23 in the first upright 10 and in the second upright 20, respectively.

This method can provide a step of inserting the through pins 92 and 102 within corresponding through holes in uprights 10 and 20.

Subsequently, the cantilever bars 50 and 60 are tightened to the ends of the tie-rods 40 by screwing the at least a first cantilever bar 50 and the at least a first and a second engagement portion or to the at least one tie-rod 40.

The at least one first lateral cantilever shelf 70 and the at least one second cantilever shelf 80 are juxtaposed with the first upright 10 and the second upright 20 approaching from the outside, aligning the cantilever bars 50 and 60 with the cantilever bars seats 61 and 81 of the lateral shelves, sliding such shelves up to abut with the first upright 10 and with the second upright 20, respectively.

A further step may be provided of fixing the at least one first lateral shelf and the at least one second lateral shelf by fixing grains which, for example, engage with the first and second cantilever beam 90, 100, or with at least a first or second cantilever bar.

Several changes, adjustments, adaptations and replacements of elements with other functionally equivalent ones can be made by a skilled person to the embodiments of the device described above in order to meet incidental needs, without departing from the scope of the following claims. Each of the features described as belonging to a possible embodiment can be obtained independently of the other embodiments described.

The invention claimed is:

1. A shelving structure, comprising:
a first upright having an outer surface and an opposite inner surface;
at least one inner shelf extending in a longitudinal direction and delimited by a first side end comprising a first abutment surface traverse to said longitudinal direction and configured to abut against said inner surface of the first upright, so that said at least one inner shelf is mounted transversely to the inner surface of the first upright, the at least one inner shelf comprising an extruded profile with the longitudinal direction being parallel to a direction of extrusion of the profile and having a cross-section orthogonal to the longitudinal direction having a thickness decreasing from a central area of the at least one inner shelf to a front edge and to a rear edge of the at least one inner shelf;
at least one first engagement portion retained in said at least one inner shelf, the at least one first engagement portion disposed on said first side end remaining rearward in relation to said first abutment surface towards the inside of the at least one inner shelf;
at least one first cantilever bar configured to be mounted projecting transversely from the outer surface of the first upright and rotatable therefrom, aligned with said first engagement portion, said first cantilever bar comprising an abutment surface configured to abut on the outer surface of the first upright;
at least one first threaded connection element free to slide in a through hole through said first upright, configured to connect the first cantilever bar and the first engagement portion so that by screwing the first threaded connection element, the abutment surface of the cantilever bar and the first abutment surface of the at least one inner shelf are drawn respectively against the outer and inner surfaces of the first upright on opposite sides of the first upright; and
at least one first lateral cantilever shelf configured to be supported by said at least one first cantilever bar projecting from said outer surface of the first upright in an aligned configuration with said at least one inner shelf, the at least one first lateral cantilever shelf having a same cross-section to the cross-section of the extruded profile of the at least one inner shelf;
wherein the at least one first lateral cantilever shelf includes at least one first seat configured to slidably receive the at least one cantilever bar within an encumbrance of the first lateral cantilever shelf such that the at least one first cantilever bar is completely disposed within the respective first lateral cantilever shelf when the first lateral cantilever shelf is affixed to the first cantilever bar.

2. The structure according to claim 1, further comprising:

a second upright having an inner surface facing said inner surface of the first upright, and an outer surface opposite the inner surface, wherein said at least one inner shelf has a second end, opposite the first side end and comprising a second abutment surface configured to abut against said inner surface of the second upright; and at least one second engagement portion retained in said at least one inner shelf, the at least one second engagement portion disposed on said second end of the at least one inner shelf remaining rearward in relation to said second abutment surface towards the inside of the at least one inner shelf;

at least one second cantilever bar configured to be mounted projecting transversely from the outer surface of the second upright and rotatable therefrom, aligned with said second engagement portion, said second cantilever bar comprising an abutment surface configured to abut on the outer surface of the second upright; and at least one second threaded connection element free to slide in a through hole which passes through said second upright configured to connect the second cantilever bar and the second engagement portion to each other so that, by screwing the second threaded connection element, the abutment surface of the second cantilever bar and the second abutment surface of the at least one inner shelf are drawn respectively against the outer and the inner surfaces of the second upright on opposite sides to the second upright.

3. The structure according to claim 2 wherein the first engagement portion and the second engagement portion are the opposite ends of a tie-rod positioned inside the at least one inner shelf, said tie-rod having a length less than the distance between the first abutment surface and the second abutment surface measured along the tie-rod.

4. The structure according to claim 3, wherein the at least one inner shelf comprises at least one rod seat extending along the longitudinal direction to receive said tie-rod, said tie-rod being free to slide in said seat in the longitudinal direction.

5. The structure according to claim 1, wherein said at least one first threaded connection element comprises an externally threaded pin attached coaxially to said at least one first cantilever bar so as to project from said first abutment surface, and said at least one first engagement portion comprises an inner thread suitable to receive the threaded pin.

6. The structure according to claim 1, further comprising at least one second lateral cantilever shelf configured to be supported by at least one second cantilever bar projecting from said an outer surface of a second upright in an aligned manner with said at least one inner shelf, on the opposite side of the second upright.

7. The structure according to claim 1, further comprising at least one first cantilever beam configured to be attached to the first upright so as to project from said outer surface to be disposed within the encumbrance of the first lateral cantilever shelf, supporting said first lateral cantilever shelf.

8. The structure according to claim 1, wherein the at least one inner shelf is delimited by an upper support surface delimited by the front edge and the rear edge parallel to the longitudinal direction, said at least one inner shelf defining a median plane orthogonal to a plane containing the front edge and the rear edge, and equidistant from the front edge and from the rear edge, said structure comprising an even number of tie-rods for said or each inner shelf, said tie-rods being arranged symmetrically in relation to said median plane, and wherein the cross-section of the at least one inner shelf has a maximum thickness at said median plane.

9. The structure according to claim 1, wherein the at least one inner shelf is an extruded metal section and the first upright is a flat metal plate.

* * * * *